Figure 1:
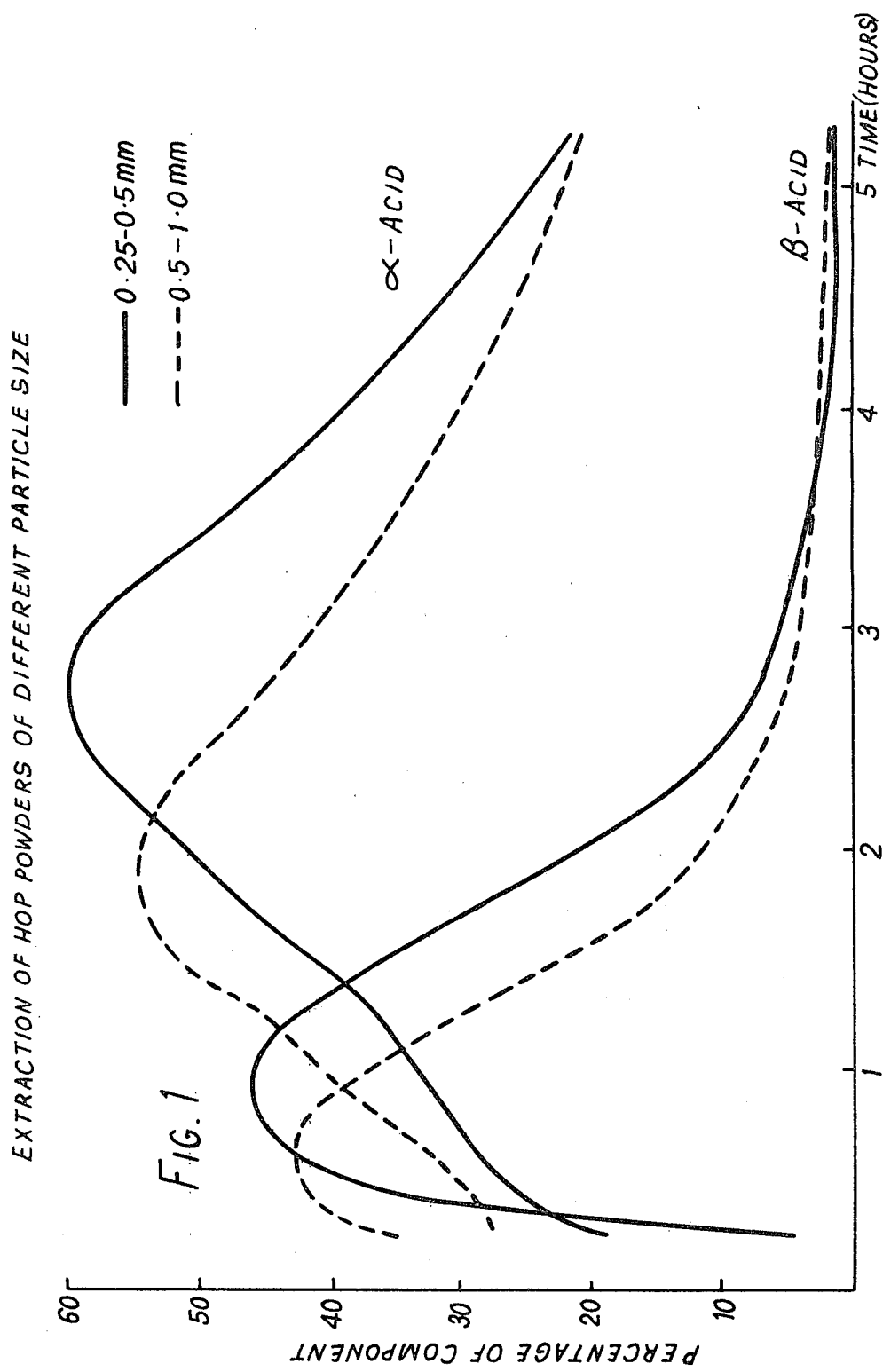

United States Patent [19]

Sharpe et al.

[11] 4,344,978
[45] Aug. 17, 1982

[54] PREPARATION OF HOP EXTRACTS RICH IN PARTICULAR CONSTITUENTS

[75] Inventors: Frederick R. Sharpe, Croydon; Christopher M. Grimmett, East Grinstead; Derek R. J. Laws, Bexleyheath, all of England

[73] Assignee: The Brewing Research Foundation, England

[21] Appl. No.: 150,987

[22] Filed: May 19, 1980

[30] Foreign Application Priority Data

May 24, 1979 [GB] United Kingdom ............... 7918075

[51] Int. Cl.³ .............................................. C12C 3/00
[52] U.S. Cl. .................................. 426/600; 426/655; 426/489; 426/431
[58] Field of Search ................ 426/431, 617, 655, 600

[56] References Cited

U.S. PATENT DOCUMENTS

| | | | |
|---|---|---|---|
| 3,717,472 | 2/1973 | Strobel | 426/431 R |
| 3,911,145 | 10/1975 | Marion | 426/651 X |
| 4,104,409 | 8/1978 | Vitzthun | 426/431 X |
| 4,123,559 | 10/1978 | Vitzthun | 426/431 X |
| 4,158,708 | 6/1979 | Chiovini | 426/651 X |
| 4,218,491 | 8/1980 | Laws | 426/655 X |

FOREIGN PATENT DOCUMENTS

| | | | |
|---|---|---|---|
| 167950 | 7/1956 | Australia | 426/431 |
| 305066 | 1/1929 | United Kingdom | 426/431 |

OTHER PUBLICATIONS

Perry's Handbook, McGraw Hill 1963, 14-42, 43.

*Primary Examiner*—Norman Yudkoff
*Attorney, Agent, or Firm*—Wenderoth, Lind & Ponack

[57] ABSTRACT

Hop extract containing a high proportion of a desired constituent, hop oil, α-acids or β-acids, is formed by extracting hops with pressurized fluid carbon dioxide, collecting separate fractions of the extract obtained at different times, and selecting the fraction having a high proportion of the desired constituent. Fractions containing (a) at least 70% of the available hop oil at at least 10% concentration, and (b) at least 25% of the available α-acids at at least 55% concentration, may be obtained in a single process by extracting initially at a lower temperature in the range 0° C. to −57° C. and subsequently at a higher temperature in the range −5° C. to 31° C.

7 Claims, 3 Drawing Figures

PREPARATION OF HOP EXTRACTS RICH IN PARTICULAR CONSTITUENTS

Hop extracts produced commercially by processing hops with organic solvents such as methanol, hexane, dichloromethane and trichloroethylene usually contain between 10 and 40% by weight of $\alpha$-acids and only small quantities of hop oil ($\sim 1\%$). The low level of essential oil results from the method of processing and the procedure used to remove the organic solvent after extraction. Commercial extracts also often contain the major proportion of the available chlorophyll, tannins, hard resins, fats and waxes present in hops. Some of these constituents are often extracted separately with water and then blended into an extract to give a product with a standard concentration of $\alpha$-acids. This standardization is important because most brewers insist that extracts used for imparting bitterness via copper hopping be of uniform composition.

Primary hop extracts which are used to prepare isomerized hop extracts are usually extensively purified and the $\alpha$-acids concentrated prior to isomerization. In these processes chlorophyll, tannins, hard resins, fats, waxes and $\beta$-acids are removed thus leaving a product having a high concentration of $\alpha$-acids. To date no such product can be prepared in a single extraction cycle.

Conventional hop extracts cannot be used to impart hop character to beer because they are usually almost devoid of hop oil, and contain residual organic solvents. There is also no simple, cheap extraction which yields a mixture containing a high proportion of the essential oil of hops while still leaving the major proportion of $\alpha$-acids available for further extraction using the same technique. Hop oil emulsions can be obtained by treating powdered hops with steam at $\sim 20°$ C. but normally only a percentage of the available oil, ca. 50%, is removed. The hops then have to be transferred to another plant and the $\alpha$-acids removed by extraction with organic solvents or liquid carbon dioxide.

Clearly a simple single stage process which could produce a range of products containing the required contents of hop oil and $\alpha$-acids would be advantageous to both the brewer and hop processor. It would be of further benefit if such a process could encompass the already obvious advantages of the liquid $CO_2$ extraction technique.

Such a process is described in the present invention.

The extraction of hops using liquid carbon dioxide has been shown (our co-pending British patent applications Nos. 42613/76 and 1944/77 and their published German Counterparts P 27 45 829 and P 28 01 843) to be a simple method of producing a highly pure, aesthetically pleasing extract containing mainly hop oil, $\alpha$- and $\beta$-acids, water and sometimes fats and waxes. The process gives a product which is free of chlorophyll, hard resins, tannins and, unlike conventional hop extract, obviously contains no trace of organic solvent. The golden yellow extracts have obvious immediate advantages over the existing hop extracts and are of at least equivalent brewing value to either conventional extract or the hops from which they are prepared.

The present invention provides a method of forming a hop extract containing a high proportion of a desired constituent selected from hop oil, $\alpha$-acids and $\beta$-acids, which method comprises passing fluid carbon dioxide under superatmospheric pressure through a packed column of hops for a period of time to effect the desired extraction, collecting separate fractions of the extract obtained at intervals during the said period, and selecting the fraction having a high proportion of the desired constituent.

This invention is based on our discovery that hop oils, $\beta$-acids and $\alpha$-acids are sequentially removed in that order from a column of hops, by a chromatographic effect, by treating with liquid carbon dioxide. This sequential removal is surprising. We have been able to demonstrate that chromatography occurs as follows:

Spent powdered hops are packed into a column and a mixture of $\alpha$-acids, $\beta$-acids and hop oils are introduced into the base of the column. Liquid carbon dioxide is then passed up through the column; early fractions are obtained which are rich in oils whilst the later fractions are rich in $\alpha$-acids.

The nature of the hops used is not critical to the invention, for all varieties appear to show the same chromatographic properties. It is desirable that the hops be milled, at least to the extent necessary to rupture the lupulin glands, e.g. to a particle diameter not exceeding 3 mm. A more finely divided material has a better chromatographic effect, results in a better separation of hop constituents, and is accordingly preferred. It is however hardly practicable to mill hops below 0.25 mm. The weight average particle diameter is preferably in the range 0.25 mm to 1.0 mm.

The comminuted hops are packed in a column through which the carbon dioxide is passed. The position and shape of the column are not critical. Good results may be obtained using a column which is straight or curved, e.g. spiral, and which stands vertical or inclined or horizontal. When the column is vertical, the carbon dioxide may be passed through it in either direction, but is preferably passed upwards to minimise the risk of channelling.

The length to diameter ratio of the column determines to a large extent the degree of separation of the hop constituents, columns with a large ratio achieving good separation. A length to diameter ratio of at least 4 is desirable to achieve significant separation. While there is no critical upper limit to the ratio, very long columns involve a large capital expenduiture and may be inconvenient and inefficient. It is preferred to use a column having a length to diameter ratio of from 20 to 200 or more. Of course, two columns connected in series and equivalent to one column for this purpose, and it may be convenient to use two or more columns connected in series rather than one long column.

The carbon dioxide is used as a fluid under superatmospheric pressure. It is known to use carbon dioxide as an extractant at temperatures below the critical temperature of about 31° C. (our own German DOS No. P 27 45 829 and No. P 28 01 843) and also at temperature above the critical temperature (Hag A.G. British patent specification No. 1,388,581). The chromatographic effects on which this invention is based occur at all temperatures, and the present invention is accordingly not limited as to temperature. However, we prefer to operate at sub-critical temperatures, that is to say using liquid carbon dioxide at between its melting point ($-57°$ C.) and its critical point ($+31°$ C.), because we thereby obtain extracts of high purity at relatively low cost. Operation below $-20°$ C. is somewhat inconvenient without providing compensating advantage, and extraction at above $+20°$ C. is somewhat less efficient, so our preferred temperature range is $-20°$ C. to $+20°$ C.

At sub-critical temperatures, the extraction pressure must be at least sufficient to maintain carbon dioxide in the liquid state at the extraction temperature chosen. The use of higher pressures increases equipment costs, without, it is thought, providing any major compensating advantages. However Mueller (German DOS No. 28 27 002) has recently suggested that extraction of hops using liquid carbon dioxide under high pressure may have advantages. The present invention is not limited as regards extraction pressure. Indeed at supercritical temperatures, the use of high pressure, and of correspondingly strong and expensive equipment, is necesary. The chromatographic effect on which this invention is based may be more pronounced at higher pressures, but is quite adequate at lower pressures.

The extraction is preferably operated as a batch process. Separate fractions of extract which come off the column at different times are collected and are found to contain different concentrations of the various hop constituents. The early fractions are found to contain relatively high concentrations of hop oil. By bulking these, it is readily possible to obtain a fraction containing at least 10%, and preferably at least 15%, by weight of hop oil and containing at least 70% by weight of the available hop oil in the starting hops.

Later fractions are found to contain relatively high concentrations of $\alpha$-acids. By bulking these, it is readily possible to obtain a fraction containing at least 55% by weight of $\alpha$-acids and not more than 15% by weight of $\beta$-acids and containing at least 25% by weight of the available $\alpha$-acids in the starting hops.

It is perfectly possible, and often advantageous, to perform the extractions in such a way as to recover both a high hop oil fraction and a high $\alpha$-acid fraction. This can very well be done without changing the operating conditions in any way during the course of the extraction. However, it is found that low temperatures are suitable for the extraction of hop oil while $\alpha$-acids are extracted somewhat more slowly. A preferred process according to the invention accordingly comprises the steps of:

(i) first extracting hops using liquid carbon dioxide at a temperature of from 0° C. down to its freezing point, preferably 0° C. to $-20°$ C., (ii) recovering a hop oil rich fraction as aforesaid, (iii) then continuing the extraction at a temperature at least 5° C. higher than that used in step (i), using liquid carbon dioxide at a temperature of from $-5°$ C. up to its critical point, preferably $-5°$ C. to $+20°$ C., and (iv) recovering an $\alpha$-acid rich fraction as aforesaid.

In order to investigate the possible sequential elution of hop components, a laboratory scale stainless steel extractor column was packed with milled hop pellets (Wye Challenger) and extracted with liquid carbon dioxide at 8° C. for 11.0 hours. The extracts were removed from the evaporator at half hourly intervals for the first 4 hours and at hourly intervals thereafter. Each fraction was weighed and analysed for $\alpha$-acid, $\beta$-acid and, where possible, hop oil. Table I shows the percentage of components present in the fractions 1–12 and Table II shows the percentage of available constituents extracted from the hops. Over 78% of the available essential oils were extracted from the hops during the first 0.5 hours. The level of $\beta$-acid reached a maximum (49.5%) in the second fraction, whilst fraction 7 contained the highest level (80.7%) of $\alpha$-acid. This experiment indicated that essential oils, $\beta$-acid and $\alpha$-acid are removed in that order when a column of hops is treated with liquid carbon dioxide.

The solubility of $\alpha$-acid in liquid carbon dioxide is known to be at a maximum at 7° C. It seemed likely that different amounts of the various components would be removed from the hops if the extraction were carried out at different temperatures. Portions of the same batch of hop pellets (Wye Challenger) were milled and extracted at 18° C. 0° C., $-10°$ C. and $-20°$ C. Fractions of extract were collected and analysed as already described for the extraction at 8° C. and the results are shown in Tables I and II.

Hop Oil

Table I shows that the oil contents of the fractions obtained by extracting the hops for 0.5 hours, at five different temperatures, were very similar (21 to 24%). In all cases the initial fraction contained much more hop oil than any of the later fractions. There is evidence (see Table II) that both the percentage of available oil extracted from the hops and the overall efficiency of extraction generally increased as the temperature of the extraction was reduced. Thus these studies have indicated that extracting hops with liquid carbon dioxide at $-20°$ C. is the preferred temperature for obtaining an early fraction which contains a high proportion of the available essential oils.

$\beta$-Acid

A comparison of the composition of the fractions listed in Table I shows that for all of the extractions the concentrations of $\beta$-acid reached a maximum in the second or third fraction. The temperature of the extraction seemed to have little effect on determining which fraction contained the maximum concentration of $\beta$-acid. However there were indications (see Table II) that the efficiency of extraction $\beta$-acid decreased as the temperature of the extraction decreased.

$\alpha$-Acid

It can be seen from Table I that for all of the extractions there were fractions (6 to 9) where the concentration of $\alpha$-acid reached a maximum. The extraction carried out at 8° C. gave the fraction with the highest level of $\alpha$-acid (80.7%) and a low level of $\beta$-acid (4.7%). There were indications from Table I that for the extractions carried out at 0° C., $-10°$ C. and $-20°$ C. the fractions containing the maximum level of $\alpha$-acid also contained substantial levels of $\beta$-acid. The efficiency of $\alpha$-acid extraction was reduced at low temperatures (see Table II).

Extracts obtained by exhaustive extraction of hops with liquid carbon dioxide usually contain 3 to 8% by weight of essential oils, 20–35% $\alpha$-acid and 40–50% $\alpha$-acid. Such extracts can be used as a substitute for hops in the copper and small scale trials have shown that hop character can be imparted to beer by the addition of a solution of extract in ethanol. Additional treials have shown that fractions which are rich in essential oils (15 to 25%) and contain reduced levels of $\alpha$- and $\beta$-acids, disperse more readily and produce less haze in beer than do extracts produced by exhaustive extraction. Consequently oil rich fractions seem to have considerable potential as a substitute for dry hops. However, fractions which are rich in $\alpha$-acid and contain low levels of $\beta$-acid appear to be ideal starting materials for the preparation of isomerized hop extracts, particularly by the process of our German DOS No. 29 19 448.

If the effects observed are due to chromatography of the hop resins, then the separation of the $\alpha$- and $\beta$-acids should vary with a change in particle size of the hop powder being extracted. Laboratory scale experiments were carried out to investigate this possibility. Wye Target hop powder of particle size 0.5–1.0 mm was treated with liquid carbon dioxide and extract fractions were removed from the extractor at intervals. The extracts were analysed for $\alpha$- and $\beta$-acids and the content of each fraction plotted against time. Hop powder of particle size 0.25–0.5 mm was treated in a similar way and the resulting analytical values are shown graphically in FIG. 1. In both experiments chromatography has taken place, the $\beta$-acid being retained for a longer time than the $\beta$-acid. However, in the case of the hop powder with the smaller particle size range the retention of both resins is greater, as would be expected from a stationary phase with a larger surface area. When hop powder of particle size 0.5–1.0 mm was extracted, the fraction containing the most $\beta$-acid ($\beta$-acid 42.4%) was removed from the evaporator after 0.5 hours; whereas for the extraction of the powder of particle size 0.25–0.5 mm the corresponding fraction ($\beta$-acid 45.8%) was removed after 1.0 hours. Similarly, when hop powder of particle size 0.5–1.0 mm was extracted, the fraction containing the most $\alpha$-acid (54.1%) was removed from the evaporator after 1.75 hours, whereas for the extraction of the powder of particle size 0.25–0.5 mm the corresponding fraction ($\alpha$-acid 59.6%) was removed after 2.75 hours.

It will be apparent therefore that due to the sequential nature of the extraction of hops with liquid $CO_2$, fractions can be prepared rich in either oil or $\alpha$-acids. This, together with the possibility of extracting at lower temperature to produce even higher oil containing fractions, provides a process which is neither costly nor wasteful. The high $\alpha$-acid fractions are not contaminated with hop oil which would have to be removed during isomerization and the high oil fractions are not rich in $\alpha$-acid which would of course be wasted when such material is used for imparting hop character. Also due to the sequential mode of extraction it is possible to prepare fractions according to the particular needs of brewing companies. The fractions that are not selected for high oil or high $\alpha$-acids can of course be bulked and used in the copper in the place of hops, conventional hop extract or whole liquid $CO_2$ extract.

Figure 2:
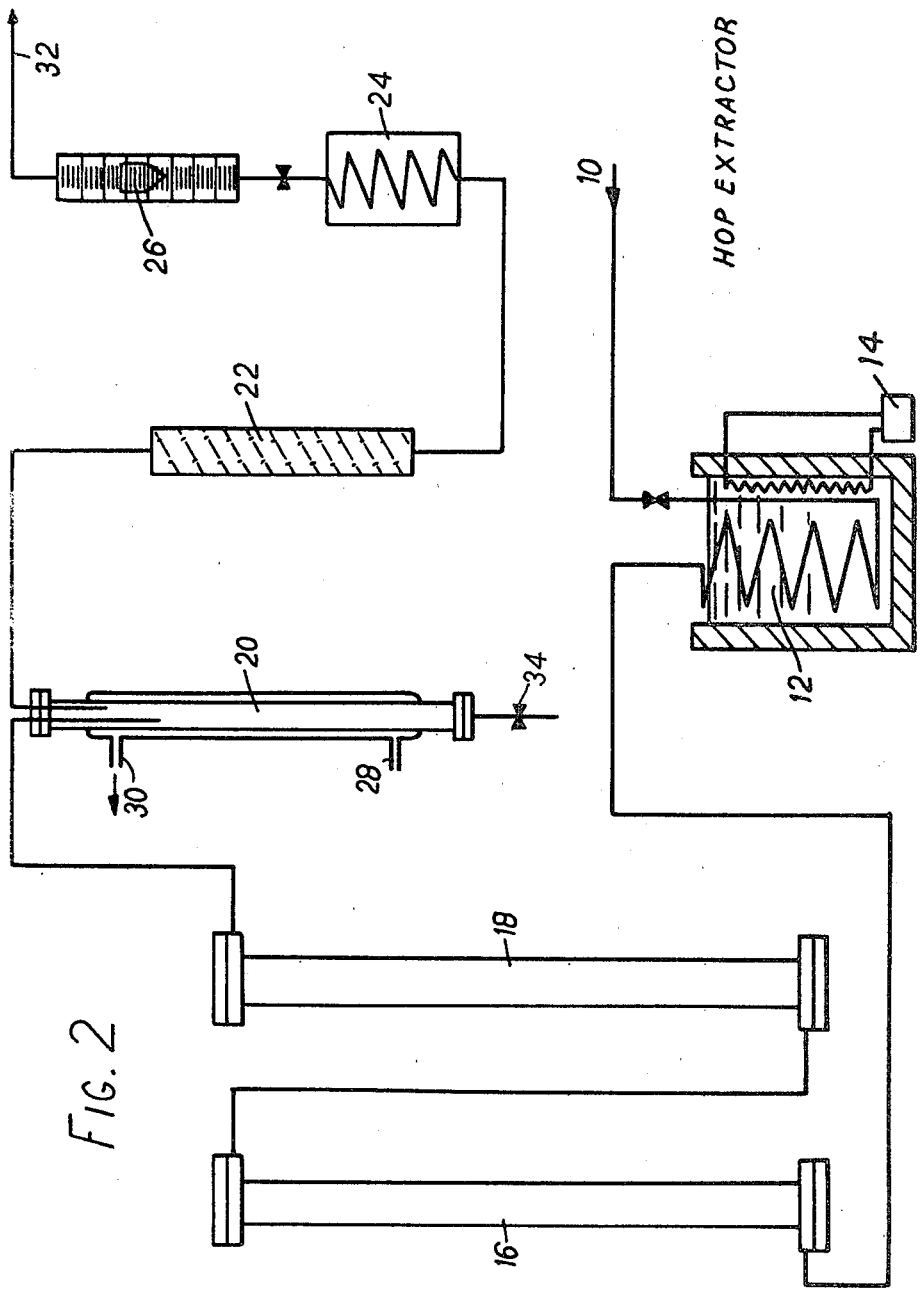

Pilot scale plant for performing the method of the invention is shown in FIG. 2.

Referring to FIG. 2, the plant comprises a liquid $CO_2$ supply 10, a cooling bath 12 supplied with a refrigeration unit 14, two stainless steel columns 16, 18, connected in series, an evaporator 20, a filter 22, a heater 24 and a flow indicator 26. These units are connected as shown in the Figure using stainless steel or nylon tubing to avoid contaminating the extract which is corrosive towards copper and iron.

The temperature of the carbon dioxide extractant is controlled by means of the cooling bath 12. In a commercial plant, prevision would be made for controlling the temperature of the columns 16 and 18 as well. The evaporator 20 is heated to 40° C. by means of a water jacket with an entry at 28 and an exit at 30. Each extraction column 16, 18 has a length of 115.0 cm and an internal diameter of 10.2 cm, giving a length to diameter ratio (of the two columns combined) of 22.5.

Milled hops are packed into the two columns 16 and 18, and are extracted with a flow of liquid $CO_2$ supplied at 10 and previously cooled at 12. The liquid $CO_2$ containing the extracted components is led to the evaporator 20, where it is evaporated. The gaseous $CO_2$ is led thrugh a filter 22 containing activated charcoal, to remove any oil or dust particles in the gas stream. The $CO_2$ then passes through a small heater 24 to avoid any danger of liquefaction and finally through a flow controller 26. The $CO_2$ leaves the system at 32 and may either be vented to the atmosphere or recycled for re-use.

The hop extract is recovered from the evaporator 20 at a tap-off point 34. Separate fractions of the extract are obtained at intervals during the period of the extraction which may typically continue for 3 to 9 hours. Each fraction may be analysed for the three hop constituents. Fractions containing a high proportion of the desired constituent may be bulked as required.

Figure 3:
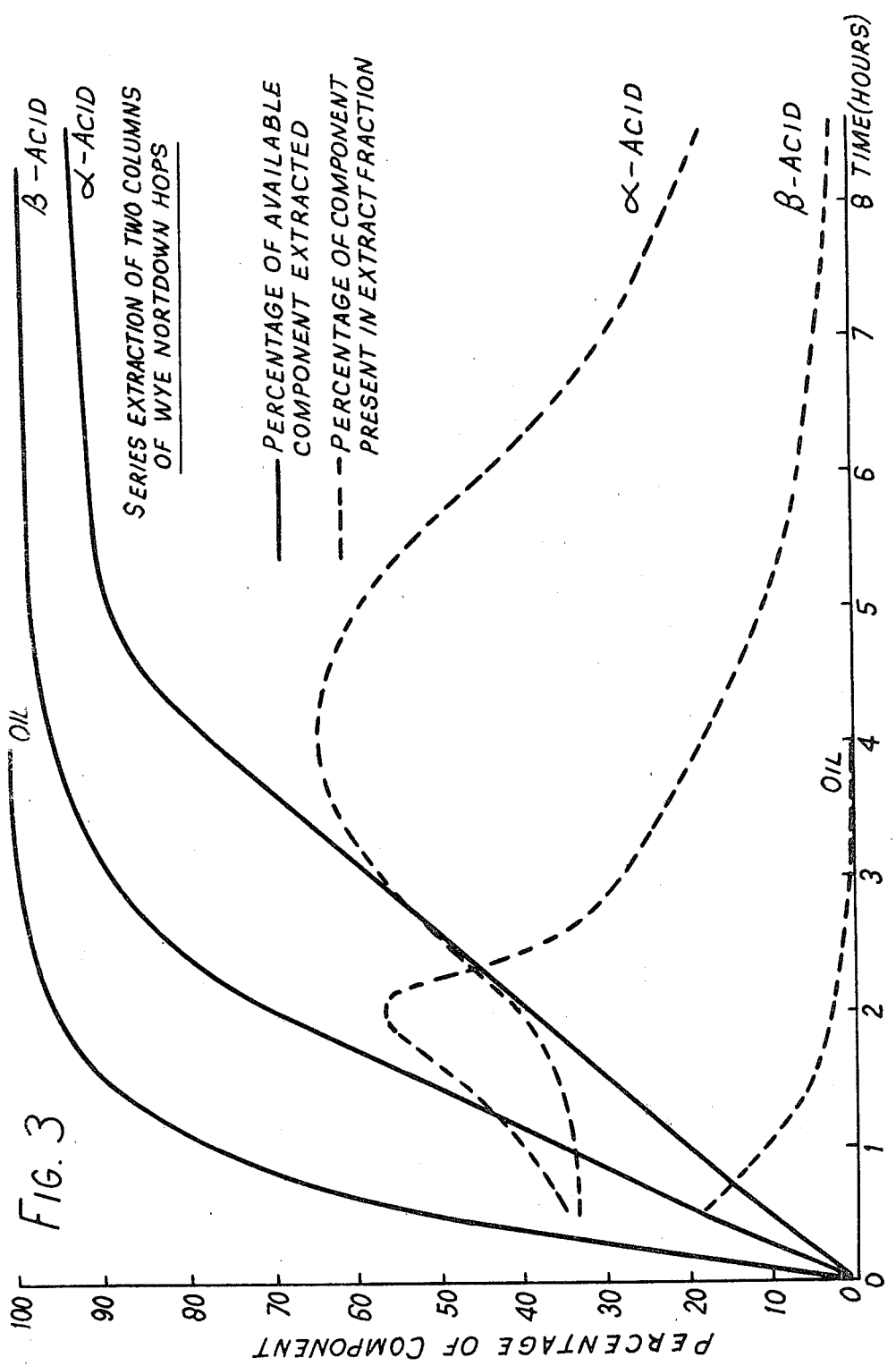

In one experiment using this equipment, the two columns 16 and 18 were filled with powdered Wye Northdown Hops and extracted with liquid carbon dioxide at 7° C. Fractions were removed from the evaporator 20 at 30 minute intervals for the first 3 hours and 60 minute intervals for the remainder of the run. The fractions were analysed for hop oil. $\alpha$-acids and $\beta$-acids and the results are shown graphically in FIG. 3.

The following Examples illustrate the invention.

EXAMPLE 1

Preparation of Extract Rich in Hop Oil

Pellets made from Wye Target hops (1977 crop) were ground in a Wiley Mill (Gallenkamp Ltd.) fitted with a 1 mm screen. The powder was analysed (essential oils 0.72% $\alpha$-acids 8.0%, $\beta$-acids 5.0%), and a portion (4250 g) was packed into a stainless steel extractor column, of diameter 10.2 cm and length 115.0 cm. The outlet from the top of the column was connected directly to the evaporator which was maintained at 40° C. The hops were extracted for 7.0 hours with liquid carbon dioxide previously cooled to 7° C. (20 kg. hour$^{-1}$), at a pressure of 44 to 64 kg.cm$^{-2}$). The extract fraction obtained during the initial 0.75 hours of extraction was removed from the evaporator and analysed for essential oils, $\alpha$-acids, and $\beta$-acids. The extracted material weighed 165.5 g, and contained 13.4% hop oil, 31.3% $\alpha$-acids, and 36.1% $\beta$-acids. The extract contained 72.8% of the available hop oil, 15.3% of the available $\alpha$-acids, and 28.1% of the available $\beta$-acids.

EXAMPLE 2

Preparation of Extract Rich in $\alpha$-Acids

Pellets made from Wye Challenger hops (1978 crop) were ground in a Willey Mill (Gallenkamp Ltd.) fitted with a 1 mm screen. The powder was analysed (essential oils 0.69%, $\alpha$-acids 5.9% $\beta$-acids 3.9%), and a portion (3000 g) was packed into each of two stainless steel extractor columns, of diameter 10.2 cm and length 115.0 cm. The columns were connected in series and the outlet from the top of the second column was connected directly to the evaporator which was maintained at 40° C. The hops were extracted for 7.0 hours with liquid carbon dioxide previously cooled to 7° C. (20 kg. hour$^{-1}$) at a pressure of 44 to 59 kg.cm$^{-2}$. The extract fraction obtained between 2.0 hours and 4.5 hours from the start of extraction was removed from the evaporator and analysed for $\alpha$-acids and $\beta$-acids. The fraction contained insufficient hop oil for analysis of this component. The extracted material weighed 267.9 g, and contained 58.3% $\alpha$-acids and 6.4% $\beta$-acids. The extract contained 44.0% of the available $\alpha$-acids and 7.2% of the available $\beta$-acids.

EXAMPLE 3

Preparation of an Extract Rich in Hop Oil, and an Extract Rich in α-Acids

Pellets made from a growth of Wye Target hops from the 1977 crop (different to that described in Example 1) were ground in a Wiley Mill (Gallenkamp Ltd.) fitted with a 1 mm screen. The powder was analysed (essential oils 0.78%, α-acids 10.5%, β-acids, 7.2%), and a portion (2950 g) was packed into each of two stainless steel extractor columns of diameter 10.2 cm and length 115.0 cm. The columns were connected in series and the outlet from the top of the second column was connected directly to the evaporator which was maintained at 40° C. The hops were extracted for 7.0 hours with liquid carbon dioxide previously cooled to 7° C. (20 kg. hour$^{-1}$) at a pressure of 44 to 59 kg.cm$^2$.

The extract fraction obtained during the initial 1.0 hours of extraction was removed from the evaporator and analysed for essential oils, α-acids and β-acids. The extracted material weighed 284.41 g and contained 12.6% hop oil, 34.4% α-acids and 34.3% β-acids. The extract contained 77.4% of the available hop oil, 15.7% of the available α-acids and 23.1% of the available β-acids.

The extract fraction obtained between 4.0 hours and 7.0 hours from the start of extraction was removed from the evaporator and analysed for α-acids and 62-acids. The fraction contained insufficient hop oil for analysis of this component. The extracted material weighed 237.05 g and contained 66.0% α-acids and 10.8% β-acids. The extract contained 25.2% of the available α-acids and 6.1% of the available 62-acids.

EXAMPLE 4

Extraction of Hops at Different Temperatures Preparation of Extracts Rich in either Hop Oil or α-Acids Pellets made from a growth of Wye Target hops from the 1977 crop (different to that described in Examples 1 and 3) were ground in a Wiley Mill (Gallenkamp Ltd.) fitted with a 1 mm screen. The powder was analysed (essential oils 0.69%, α-acids 7.6%, β-acids 5.0%), and a portion (4250 g) was packed into a stainless steel extractor column, of diameter 10.2 cm and length 115.0 cm. The outlet from the top of the column was connected directly to the evaporator which was maintained at 40° C. The hops were extracted for 7.0 hours with liquid carbon dioxide (20 kg.hour$^{-1}$), at a pressure of 44 to 66 kg.cm$^{-2}$. The temperature of extraction was −20° C. during the first 1.0 hours rising to 7° C. for the remainder of the run.

The extract fraction obtained during the initial 0.75 hours of extraction was removed from the evaporator and analysed for essential oils, α-acids, and β-acids. The extracted material weighed 138.60 g and contained 15.4% hop oil, 30.4% α-acids and 37.8% β-acids. The extract contained 73.0% of the available hop oil, 13.0% of the available α-acids and 24.7% of the available β-acids.

The extract fraction obtained between 2.5 hours and 4.0 hours was removed from the evaporator and was found on analysis to contain a high proportion of α-acids.

TABLE I

The Extraction of Wye Challenger Hops at Different Temperatures
Percentage of Hop Components in Extract Fraction

| Fraction No. | Hop Oil | | | | | α-acid (LCV) | | | | | β-acid (column chromatographic method) | | | | |
|---|---|---|---|---|---|---|---|---|---|---|---|---|---|---|---|
| | 18° C. | 8° C. | 0° C. | −10° C. | −20° C. | 18° C. | 8° C. | 0° C. | −10° C. | −20° C. | 18° C. | 8° C. | 0° C. | −10° C. | −20° C. |
| 1 | 21.6 | 23.6 | 22.8 | 23.7 | 23.2 | 20.3 | 27.0 | 31.3 | 29.2 | 28.1 | 26.8 | 38.8 | 32.0 | 23.5 | 20.5 |
| 2 | ↑ | ↑ | 5.5 | 5.2 | 2.9 | 39.2 | 41.4 | 40.8 | 39.7 | 39.1 | 45.4 | 49.5 | 36.7 | 37.8 | 32.2 |
| 3 | ↑ | ↑ | ↑ | ↑ | ↑ | 41.0 | 42.6 | 46.2 | 44.8 | 41.4 | 47.7 | 44.5 | 34.1 | 34.6 | 35.2 |
| 4 | ↑ | ↑ | ↑ | ↑ | ↑ | 44.4 | 47.9 | 54.2 | 51.6 | 45.0 | 41.3 | 36.3 | 25.9 | 27.3 | 32.3 |
| 5 | 1.3 | 0.5 | 0.7 | 0.5 | 1.1 | 53.7 | 61.2 | 60.6 | 57.7 | 53.0 | 35.1 | 21.2 | 20.2 | 22.9 | 21.5 |
| 6 | ↓ | ↓ | ↓ | ↓ | ↓ | 64.3 | 73.8 | 66.9 | 62.0 | 61.5 | 22.4 | 8.3 | 14.7 | 23.8 | 15.7 |
| 7 | ↓ | ↓ | ↓ | ↓ | ↓ | 71.0 | 80.7 | 64.6 | 61.7 | 64.2 | 12.5 | 4.7 | 9.9 | 19.6 | 14.4 |
| 8 | | | | | | 73.3 | 79.7 | 61.8 | 60.2 | 62.5 | 8.1 | 4.1 | 9.3 | 14.4 | 13.6 |
| 9 | | | | | | 76.3 | 65.7 | 54.5 | 58.6 | 58.8 | 4.0 | 2.0 | 3.2 | 10.5 | 11.0 |
| 10 | | | | | | 72.6 | 34.7 | 40.2 | 51.8 | 52.1 | 3.6 | 1.3 | 2.7 | 7.0 | 9.2 |
| 11 | | | | | | 67.0 | 19.1 | 29.1 | 46.3 | 46.7 | — | — | — | — | — |
| 12 | | | | | | 57.0 | 19.3 | 24.0 | 36.3 | 59.9 | — | — | — | — | — |

TABLE II

The Extraction of Wye Challenger Hops at Different Temperatures
Percentage of Available Hop Components Extracted

| Fraction No. | Hop Oil | | | | | α-acid (LCV) | | | | | β-acid (column chromatographic method) | | | | |
|---|---|---|---|---|---|---|---|---|---|---|---|---|---|---|---|
| | 18° C. | 8° C. | 0° C. | −10° C. | −20° C. | 18° C. | 8° C. | 0° C. | −10° C. | −20° C. | 18° C. | 8° C. | 0° C. | −10° C. | −20° C. |
| 1 | 66.3 | 78.2 | 72.0 | 74.9 | 83.6 | 6.6 | 9.4 | 10.1 | 9.8 | 10.5 | 17.4 | 27.1 | 21.7 | 16.0 | 15.6 |
| 2 | ↑ | ↑ | 86.0 | 86.8 | 88.6 | 13.1 | 17.1 | 20.6 | 19.3 | 17.5 | 32.2 | 45.9 | 41.8 | 34.5 | 27.3 |
| 3 | ↑ | ↑ | ↑ | ↑ | ↑ | 21.1 | 28.3 | 32.4 | 29.5 | 24.0 | 50.6 | 69.3 | 60.1 | 50.6 | 38.5 |
| 4 | ↑ | ↑ | ↑ | ↑ | ↑ | 29.6 | 37.9 | 44.0 | 39.2 | 31.3 | 66.4 | 84.1 | 71.9 | 61.0 | 49.3 |
| 5 | 76.9 | 83.5 | 92.4 | 90.8 | 96.0 | 37.0 | 46.6 | 56.0 | 49.2 | 38.0 | 75.9 | 90.2 | 80.4 | 69.1 | 54.8 |
| 6 | ↓ | ↓ | ↓ | ↓ | ↓ | 44.6 | 57.4 | 65.7 | 58.0 | 44.7 | 81.1 | 92.6 | 84.9 | 76.0 | 58.2 |
| 7 | ↓ | ↓ | ↓ | ↓ | ↓ | 51.2 | 68.5 | 74.2 | 66.1 | 54.0 | 83.5 | 93.9 | 87.6 | 81.3 | 62.5 |
| 8 | | | | | | 59.9 | 77.5 | 79.9 | 71.3 | 60.4 | 85.4 | 94.8 | 89.4 | 83.8 | 65.3 |
| 9 | | | | | | 72.9 | 86.4 | 87.0 | 78.6 | 67.8 | 86.7 | 95.3 | 90.3 | 86.4 | 68.2 |
| 10 | | | | | | 80.9 | 88.6 | 89.4 | 83.9 | 71.4 | 87.5 | 95.5 | 90.7 | 87.9 | 69.5 |
| 11 | | | | | | 86.2 | 89.7 | 90.5 | 85.6 | 72.7 | 87.8 | — | 91.1 | 88.8 | 70.0 |
| 12 | | | | | | 89.5 | 90.3 | 91.0 | 86.3 | 73.6 | — | — | — | — | — |

TABLE II-continued

The Extraction of Wye Challenger Hops at Different Temperatures
Percentage of Available Hop Components Extracted

| Fraction No. | Hop Oil | | | | | α-acid (LCV) | | | | | β-acid (column chromatographic method) | | | | |
| --- | --- | --- | --- | --- | --- | --- | --- | --- | --- | --- | --- | --- | --- | --- | --- |
| | 18° C. | 8° C. | 0° C. | −10° C. | −20° C. | 18° C. | 8° C. | 0° C. | −10° C. | −20° C. | 18° C. | 8° C. | 0° C. | −10° C. | −20° C. |
| 13 | | | | | | 91.6 | 90.6 | 91.3 | 86.8 | 74.0 | — | — | — | — | — |
| Total | | | | | | 97.5 | 93.4 | 92.4 | 89.0 | 77.9 | 89.5 | 96.2 | 91.3 | 89.7 | 72.2 |

We claim:

1. A single stage method of forming a hop extract containing a high proportion of a desired constituent selected from hop oil, α-acids and β-acids, which method comprises passing fluid carbon dioxide under superatmospheric pressure through a packed column of hops in comminuted form having a weight average particle diameter in the range 0.25 mm to 1.0 mm, for a period of time to effect the desired extraction, collecting separate fractions of the extract obtained at intervals during the said period, and selecting the fraction having a high proportion of the desired constituent, whereby there is obtained a fraction of the extract containing at least 55% by weight of α-acids and not more than 15% by weight of β-acids and containing at least 25% by weight of the available α-acids in the starting hops.

2. The single stage method as claimed in claim 1 wherein there is additionally obtained a fraction containing at least 10% by weight of hop oil and containing at least 70% by weight of available hop oil in the starting hops.

3. A single stage method of forming a hop extract containing a high proportion of a desired constituent selected from hop oil, α-acids and β-acids, which method comprises passing fluid carbon dioxide under superatmospheric pressure through a packed column of hops in comminuted form having a weight average particle diameter in the range 0.25 mm to 1.0 mm, for a period of time to effect the desired extraction, collecting separate fractions of the extract obtained at intervals during the said period, and selecting the fraction having a high proportion of the desired constituent, whereby there is obtained a fraction of the extract containing at least 10% by weight of hop oil and containing at least 70% by weight of the available hop oil in the starting hops.

4. A method as claimed in claim 1 or 3 wherein the column of hops has a length to diameter ratio of at least 4.

5. A method as claimed in claim 4, wherein the column of hops has a length to diameter ratio of from 20 to 200.

6. A method as claimed in claim 1 or 3 wherein the carbon dioxide used is in the liquid state, at a temperature from its melting point to its critical point.

7. A method as claimed in claim 1 or 3, comprising the steps of:
(i) first extracting the hops using liquid carbon dioxide at a temperature of from 0° C. down to its freezing point,
(ii) recovering a fraction having a high proportion of hop oil,
(iii) then continuing the extraction at a temperature at least 5° C. higher than that used in step (i), using liquid carbon dioxide at a temperature of from −5° C. up to its critical point, and
(iv) recovering a fraction having a high proportion of α-acids.

* * * * *